United States Patent
Silvandersson

[15] 3,703,252
[45] Nov. 21, 1972

[54] METHOD OF AND APPARATUS FOR PRODUCING A TUBING FROM A STRIP OF MATERIAL

[72] Inventor: Jonnie Thor-Leif Silvandersson, Knared, Sweden

[73] Assignee: AB Akerlund & Rausing, Lund, Sweden

[22] Filed: May 18, 1970

[21] Appl. No.: 38,058

[30] Foreign Application Priority Data

May 28, 1969 Sweden ..................7471/69

[52] U.S. Cl. ..........................228/15, 72/48, 228/47
[51] Int. Cl. ............................................B23k 1/20
[58] Field of Search ..........228/15, 16, 47; 72/48, 49

[56] References Cited

UNITED STATES PATENTS

| | | | |
|---|---|---|---|
| 3,072,770 | 1/1963 | Goodridge | 29/477.7 X |
| 3,118,406 | 1/1964 | Stanton | 29/477.7 X |
| 3,164,896 | 1/1965 | Fullman | 29/477.7 X |
| 3,430,475 | 3/1969 | Lurdmark | 29/477.7 X |
| 452,909 | 5/1891 | Wurstenhofer | 228/15 |
| 2,017,397 | 10/1935 | Esser | 228/16 X |
| 3,090,336 | 5/1963 | Gruter | 228/15 |
| 3,309,003 | 3/1967 | Crawford | 228/15 |
| 3,333,754 | 8/1967 | Catalano | 228/15 |
| 3,474,522 | 10/1969 | Rowell | 228/16 |

*Primary Examiner*—John F. Campbell
*Assistant Examiner*—Richard Bernard Lazarus
*Attorney*—Pierce, Scheffler & Parker

[57] ABSTRACT

Apparatus for forming continuous tubing from a strip of web-like material such as plastic and the like in which a guide tube is surrounded by a shaping tube and spaced therefrom, said shaping tube having a terminal edge oblique to the longitudinal axis thereof, so that the strip of material in the shape of a longitudinal open channel is advanced at a substantial angle to the axis of the shaping tube and is folded inwardly about the oblique terminal edge thereof so as to surround the guide tube with its longitudinal edges overlapped. The web-like material can be welded or heat sealed along the overlapping edges to form continuous tubing. Also if desired the shaped strip of material can be folded inwardly over the end of the guide tube and a filling pipe can be inserted into the tubing for admitting substances into the tubing so that packages can be formed as the continuous tubing is advanced.

6 Claims, 4 Drawing Figures

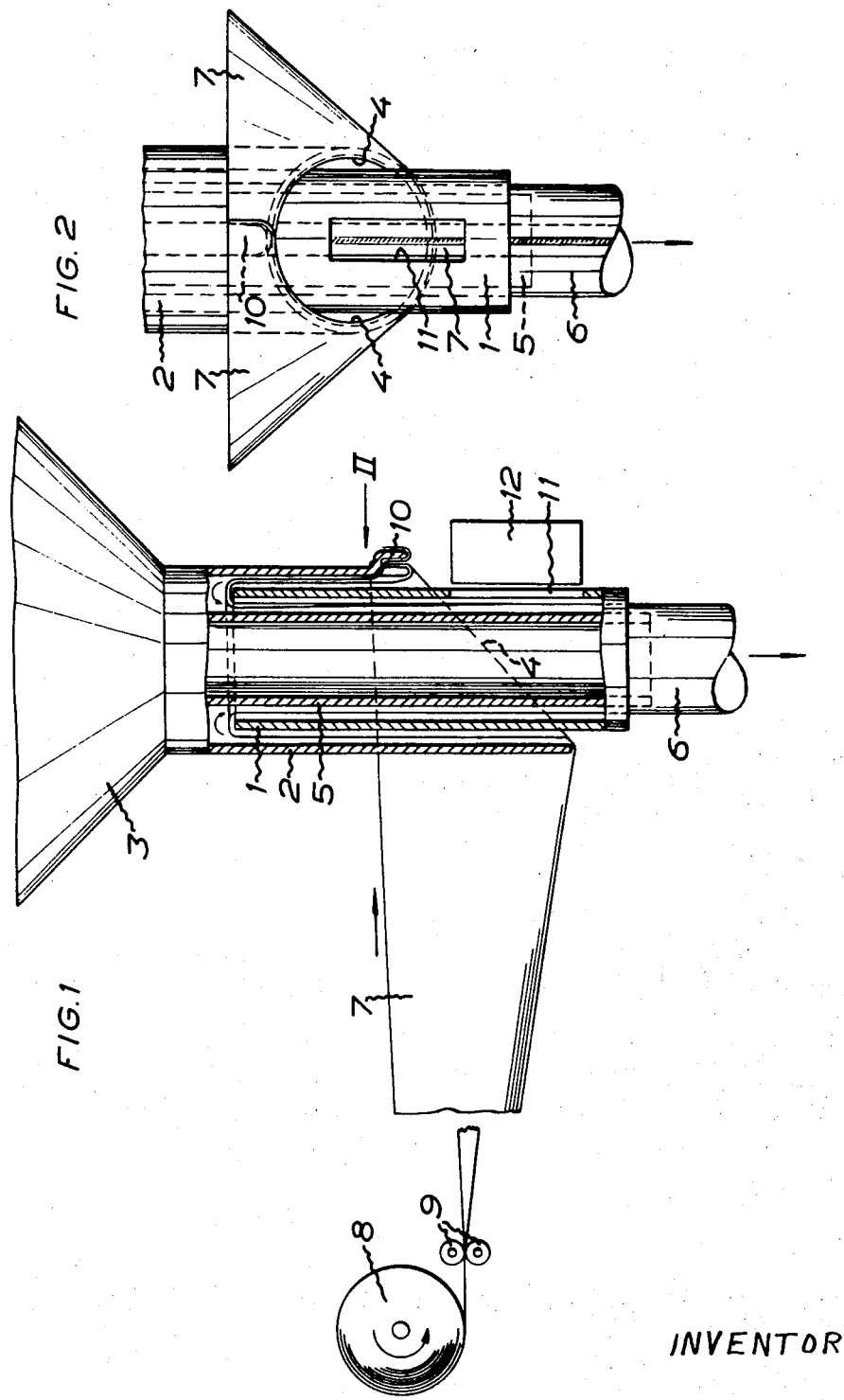

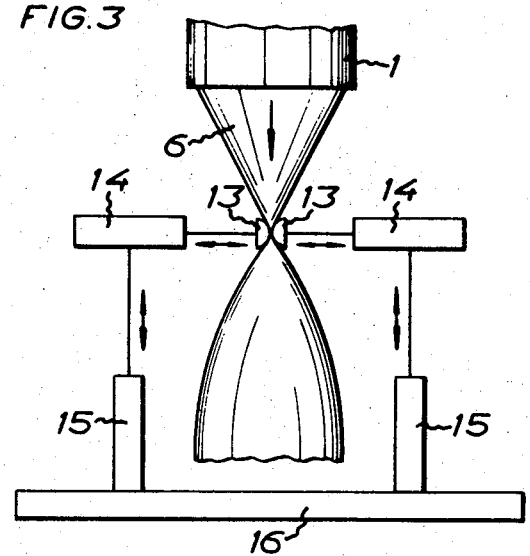
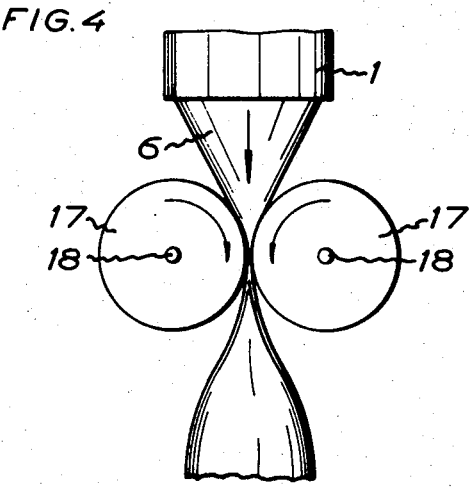

METHOD OF AND APPARATUS FOR PRODUCING A TUBING FROM A STRIP OF MATERIAL

This invention relates to a method of making a tubing from a strip of web-like material such as plastic films or the like, in which the strip is conducted around a guide tube longitudinally thereof with the longitudinal side edges of the strip in overlapping relationship, and in which the overlapping edges are welded or heat sealed together to form the tubing.

In a previously known method the strip is supplied from above to the guide tube around which the strip is conducted downwardly while the overlapping side edges thereof are welded together. This prior art method is disadvantageous in that the strip has to be moved a relatively large distance along the guide tube before the longitudinal side edges of the strip overlap sufficiently that the strip can be welded together to form the tubing. As a result, the guide tube must be made relatively long, which is disadvantageous for considerations of space. Besides the space above the guide tube cannot be exploited in the desired manner, e.g., for arranging a hopper for the products to be filled into the finished tubing.

The primary object of the present invention is to eliminate the above mentioned disadvantages, and to this end the invention provides a method in which the strip in the form of an open channel is advanced at a substantial angle such as at right angles to a shaping tube which surrounds the guide tube with clearance and has a terminal edge which is oblique to the axis of the shaping tube and about which the web or strip is folded inwardly between the shaping tube and the guide tube to be conducted around said guide tube.

The invention also relates to an apparatus for carrying out the above mentioned method, comprising a guide tube for guiding a strip surrounding said tube, a welding or heat sealing device for welding together the overlapping longitudinal side edges of the strip to form a tubing, and a shaping tube surrounding the guide tube with clearance. Characteristic of this apparatus is that the shaping tube has a terminal edge which is oblique to the axis of the shaping tube and about which the strip is advanced substantially at right angles to the guide tube and is adapted to be folded inwardly between the shaping tube and the guide tube so as to enclose the guide tube with the longitudinal side edges of the strip in overlapping relationship.

The invention will be more fully described in the following with reference to the accompanying drawings in which:

FIG. 1 is a diagrammatic view, partly in longitudinal section, of the apparatus according to the invention;

FIG. 2 is an elevational view showing part of the apparatus, with a welding device removed, in the direction of the arrow II in FIG. 1;

FIGS. 3 and 4 are side views of the lower portion of the apparatus illustrated in FIGS. 1 and 2 and diagrammatically show two different mechanisms for pulling a tubing downwardly from a guide tube.

The apparatus illustrated in the drawings comprises a guide tube 1 which is surrounded over part of its length by a shaping tube 2 concentrically arranged with respect to and spaced from the guide tube 1. The diameter of the shaping tube is so much larger than that of the guide tube that a clearance of several millimeters is formed between them. At the upper end of the shaping tube 2 is welded or otherwise secured to a filling hopper 3 the purpose of which will be described in the following, and at the lower end the shaping tube has a terminal edge 4 which is oblique to the axis of the shaping tube and preferably makes an angle of about 45° with said axis. The purpose of said terminal edge will likewise be described in the following. A fill pipe 5 is welded or otherwise secured at its upper end (not shown) to the lower part of the hopper 3 to communicate therewith. The fill pipe 5 is concentrically disposed inside the guide tube 1 and the diameter of the fill pipe is so much smaller than that of the guide tube that a clearance of several millimeters is formed between them.

To make a tubing 6 from a strip of material 7 one proceeds as follows. From a supply roll 8 preferably located laterally of the apparatus the strip of material 7 is advanced, possibly over one or more guide rollers 9, in the form of an open channel at an angle, preferably a right angle, to the shaping tube 2 and is folded about the oblique terminal edge 4 of said tube 2 inwardly between the shaping tube and the guide tube, whereupon the strip is conducted around the guide tube 1 with its longitudinal side edges in overlapping relationship. This overlap is realized with the aid of a slot 10 formed at the rear part of the oblique terminal edge 4, as seen in the feed direction of the strip. In the embodiment illustrated the slot 10 has been formed by first cutting open the shaping tube 2 longitudinally over part of its length and then pulling the edges defining the cut into overlapping relationship. The longitudinal side edges of the strip 7 are fed into said slot, one side edge of the strip being folded over one edge of the slot while the other side edge of the strip is folded over the other edge of the slot.

Having been wrapped around the guide tube 1 with the side edges of the strip in overlapping relationship, the strip is folded inwardly 180° over the upper terminal edge of the guide tube 1, said edge being spaced from the hopper 3 to prevent jamming of the strip during the advance thereof, and is then moved into the space between the guide tube 1 and the fill pipe 5. During the downward movement between the guide tube and the fill pipe the overlapping side edges of the strip move past an opening 11 formed in the guide tube 1. Disposed opposite the opening 11 is a welding or heat sealing device 12 of known type where the overlapping side edges are welded together to form the tubing 6 from the strip of material 7. After the tubing has been welded, it can be cut and sealed transversely of its longitudinal direction to form bags (not shown). The tubing may be filled between adjacent seals with products, such as potatoes, supplied from the hopper 3 to the fill pipe 5. Considerable time is saved by proceeding in accordance with the invention, that is supplying a strip of material and the products to be packaged at one end of the apparatus and obtaining the packaged products at the other end.

It should be mentioned, however, that it is, of course, not necessary to fill the tubing and/or to manufacture bags from it; one may very well make tubings only and sell them as semi-manufactured products. If it is desired to make the tubing only, the hopper 3 and the fill pipe 5 can be dispensed with.

FIGS. 3 and 4 diagrammatically illustrate two different mechanisms for pulling the finished tubing 6 downwardly from the guide tube 1. In the mechanism illustrated in FIG. 3 the tubing 6 is intermittently pulled downwardly by means of two clamping jaws 13 which are mounted at the outer ends of piston rods of two hydraulically or pneumatically operable cylinders 14 and which by operation of said cylinders are moved into engagement with the tubing 6. To pull down the tubing 6 with the jaws 13 engaged therewith as shown the cylinders 14 are moved away from the guide tube 1 each by means of a hydraulically or pneumatically operable cylinder 15 which is connected at one end with one of the cylinders 14 and at the other end with a frame 16. Of course, the cylinders 14 may also be movable towards the guide tube 1 with the aid of the cylinders 15, and while so moving the clamping jaws 13 are retracted in order not to engage the tubing 6 so as to avoid crinkling it. In the mechanism illustrated in FIG. 4 the tubing 6 is pulled continuously downwardly by two drive rollers 17 which are rotatable about parallel shafts 18 and have their peripheries so close together as to form a nip between them for pulling down and moving the tubing 6 downwardly.

It should also be mentioned that the strip need not necessarily be folded inwardly about the upper terminal edge of the guide tube; it may very well be advanced directly to a welding station.

Of course, the invention is not limited to the embodiment described above and shown in the drawings since several modifications are conceivable within the scope of the appended claims.

I claim:

1. Apparatus for forming continuous tubing from a strip of web-like material comprising an outer shaping tube, an inner guide tube arranged concentrically within and spaced from said shaping tube, said shaping tube having a terminal edge oblique to the longitudinal axis thereof, whereby the strip of web-like material in the form of a substantially open channel may be advanced at a substantial angle to the axis of said shaping tube to be folded inwardly about the oblique terminal edge of said shaping tube, and within the space between said shaping tube and said guide tube, the longitudinal side edges of the strip being overlapped to surround said guide tube and means for sealing together the overlapped side edges of the strip of web-like material to form a continuous tubing.

2. Apparatus as claimed in claim 1 wherein the oblique terminal edge of said shaping tube makes an angle of 45° with the axis of said shaping tube.

3. Apparatus as claimed in claim 1 wherein the oblique terminal edge of said shaping tube is provided at the rear thereof as seen in the direction of feed of the strip of web-like material with a slot means for directing the edges of the strip into an overlapping relation when the strip of web-like material is folded inwardly about the oblique terminal edge.

4. Apparatus as claimed in claim 1 wherein the shaped tubing surrounding said guide tube is folded inwardly over the end of said guide tube and further comprising a fill pipe disposed concentrically within and spaced from said guide tube, whereby said shaped tubing after being folded inwardly over the end of said guide tube will surround said fill pipe so that said continuous tubing can be filled as the tubing is formed.

5. Apparatus as claimed in claim 4, wherein said sealing means are disposed below the oblique terminal edge of said shaping tube and adjacent said guide tube.

6. Apparatus as claimed in claim 1 and further comprising means for advancing said strip of web-like material through said apparatus by drawing said continuous tubing from said apparatus.

* * * * *